Nov. 19, 1935.  C. E. RUTHERFORD  2,021,492
ELECTRICAL CONDUIT FITTING
Filed March 2, 1935   2 Sheets-Sheet 1
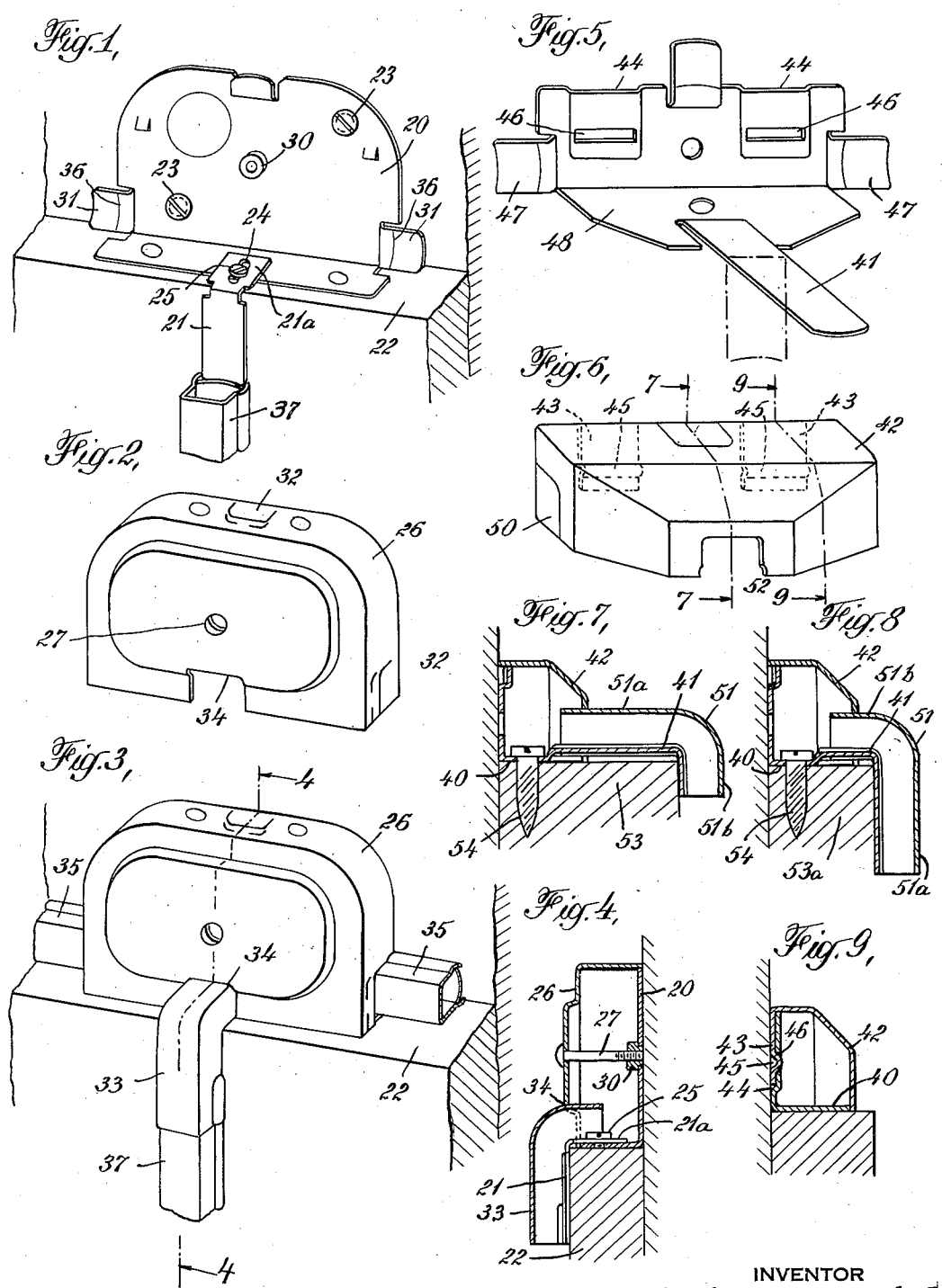
INVENTOR
*Charles E. Rutherford*
BY
ATTORNEYS Nov. 19, 1935.   C. E. RUTHERFORD   2,021,492
ELECTRICAL CONDUIT FITTING
Filed March 2, 1935    2 Sheets-Sheet 2
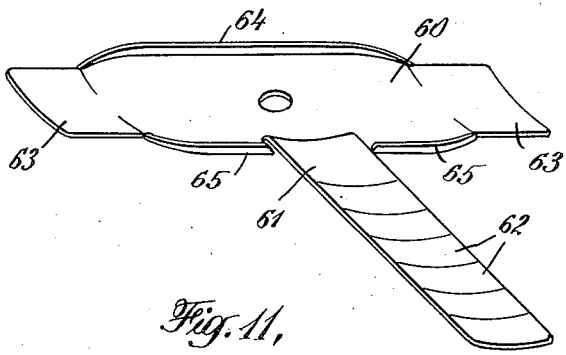
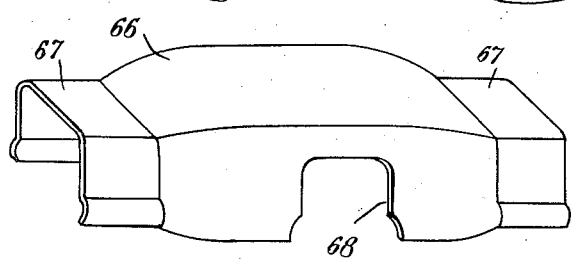
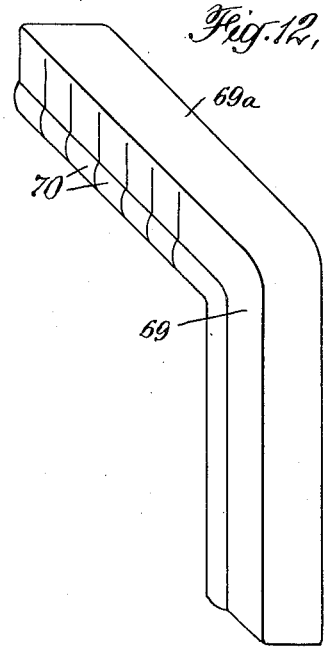
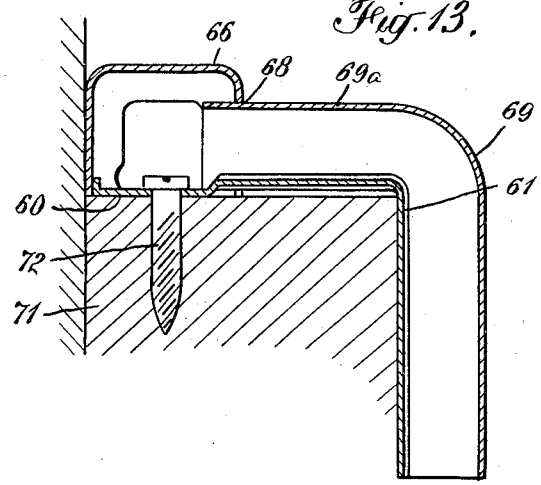
INVENTOR
Charles E. Rutherford
BY
Pennie Davis Marvin & Edmonds
ATTORNEYS Patented Nov. 19, 1935

2,021,492

UNITED STATES PATENT OFFICE 2,021,492

ELECTRICAL CONDUIT FITTING

Charles E. Rutherford, West Hartford, Conn., assignor to The Wiremold Company, a corporation of Connecticut Application March 2, 1935, Serial No. 9,022

8 Claims. (Cl. 247—15)

This invention relates to improvements in electrical conduit fittings, and has for an object the provision of improved fittings of an adjustable type. More particularly, the invention contemplates the provision of improved adjustable conduit fittings for installation over baseboards or similar projections of various thicknesses.

In the installation of electrical conduits on the walls and other interior surfaces of a building, it is highly desirable to have the conduit lie flat against the wall or other surface upon which it is mounted to make it as inconspicuous as possible, to avoid crevices or other spaces in which dirt can accumulate and to eliminate, to as great an extent as possible, any mechanical strain on the conduit system. This is relatively easy to accomplish when the wall is flat and there are no projections over which the conduit must pass, but it frequently happens that the conduit must overlie some projection, such, for example, as a baseboard. Fittings for installation over baseboards and like projections have long been obtainable upon the market, but heretofore unless the projection was of the precise thickness for which the fitting was designed, it has been very difficult, if not impossible, to make a neat and mechanically unstrained installation, with the conduit flat against both the surface of the wall and the surface of the projection, without a considerable expenditure of time and effort.

The present invention provides a simple, cheap, and easily installed conduit fitting for use in conjunction with electrical conduits, whereby conduits overlying a wall and a projection extending outwardly therefrom, such as a baseboard, may be caused to lie flat against the surface of the wall and the surface of the outwardly extending projection. The fitting of the invention, which comprises the component parts of a receptacle having an elbow associated therewith, is so constructed that the position of the elbow with respect to the receptacle may be adjusted to the requirements of any particular installation.

The invention is described below in conjunction with the accompanying drawings, in which Fig. 1 is a perspective view of a base member of a fitting constructed in accordance with the invention;

Fig. 2 shows in perspective a cover member for use in conjunction with the base member shown in Fig. 1;

Fig. 3 is a perspective view of the complete fitting of which elements are shown in Figs. 1 and 2;

Fig. 4 is a vertical cross section of a fitting taken substantially along the line 4—4 of Fig. 3;

Fig. 5 is a perspective view of a base member of a modified form of fitting constructed in accordance with the invention;

Fig. 6 is a perspective view of a cover member adapted for use in conjunction with the base member shown in Fig. 5;

Fig. 7 is a vertical cross section through an assembled fitting of which elements are shown in Figs. 5 and 6, taken substantially along a line corresponding to the line 7—7 of Fig. 6;

Fig. 8 is a vertical cross section similar to Fig. 7, but showing a modified assembly of the fitting;

Fig. 9 is a vertical cross section through a fitting of which elements are shown in Figs. 5 to 8, taken substantially along a line corresponding to the line 9—9 of Fig. 6;

Fig. 10 is a perspective view of a modified form of base member constructed in accordance with the invention;

Fig. 11 is a perspective view of a cover member for use in conjunction with the base member shown in Fig. 10;

Fig. 12 is a perspective view of an elbow cover especially adapted for use in conjunction with the members shown in Figs. 10 and 11; and Fig. 13 is a vertical cross section through an assembled fitting comprising the elements shown in Figs. 10 to 12.

In the fitting shown in Figs. 1 to 4, a base member 20 having associated therewith a tongue 21 is mounted over a baseboard or other projection 22 and is held in position by screws 23. The tongue 21 is bent transversely adjacent its midportion and is adapted to engage with a conduit portion and serve as the base member of an elbow. One leg portion 21a of the tongue 21 is provided with a slot 24, through which extends a screw 25. The screw 25 engages threads in the base member 20, and its head is of sufficiently great diameter to engage the side portions of the slot 24. By loosening the screw 25, the tongue may be adjusted by sliding it in or out within limits determined by the length of the slot 24, and when it has been properly positioned, the screw 25 is tightened to hold it firmly in place.

A cover member 26 is provided to engage with the base member 20 and to form therewith an enclosed receptacle. When installed, the cover member 26 is held in position by means of a bolt 27 extending through the cover member and engaging with a threaded member 30 firmly connected to the base member. Means associated with the base member 20, for example, small tongues 31, and cooperating means associated with the cover member 20, for example, knockout portions 32, are provided to engage with conduits leading to the assembled fitting and to receive them in the receptacle.

To complete the fitting an elbow cover 33 is provided. The elbow cover 33 engages with the tongue 21 associated with the base member 20 to provide an enclosed elbow, and is received in the receptacle through a suitable opening 34 in the cover member 26.

The fitting is installed as follows: The base member 20 is mounted in the correct position over a baseboard 22 or other projection, and is screwed or otherwise fastened in place. Conduits 35 through which wires are introduced into the fitting may next be installed, the conduits engaging with the small tongues 31 of the base member. Small tongues which are not to be so employed may be broken off adjacent scores 36, or may be suitably cut or sawed in such a manner that they do not project outwardly beyond the edge of the base member 20.

The tongue 21 is adjusted to its proper position, as determined by the thickness of the baseboard 22, for the particular installation in question, and is then fastened in place by tightening the screw 25. After a conduit 37 leading to the elbow has been introduced into engagement with the tongue 21 and wires have been drawn therethrough, the elbow cover 33 is placed in position so that it overlaps the end portion of the conduit 37. All necessary electrical connections are made, and thereafter the cover member 26 is mounted in position and fastened to the base member 20 by means of the bolt 27 to complete the assembly.

The upper leg portion of the elbow cover 33 is of sufficient length so that it will meet with and engage the opening 34 in the cover member 26 when the tongue 21 is adjusted to extend outwardly from the receptacle the maximum distance allowed by the slot 24; on the other hand, the interior of the receptacle is of sufficient depth so that at the other extreme of adjustment, when the tongue 21 extends inwardly as far as the slot 24 will allow it to go, there is space for enough of the elbow cover 33 to project into the interior of the receptacle to allow the lower leg of the elbow cover to come flush with the wall. By virtue of this capability of adjustment of the tongue, combined with the corresponding capability of adjustment of the elbow cover, I am able to secure the results described above with the conduit 37 lying flat against the surface of the baseboard or other projection, with the tongue 21 properly engaging with the conduit 37, and with the elbow cover engaging the conduit 37, the tongue 21, and the opening 34, within a range of thickness of baseboard determined by the length of the slot 24.

Where greater degrees of adjustability are desired I use the modified form shown in Figs. 5 to 13.

In the modified fitting shown in Figs. 5 to 9, a base member 40 is provided with a tongue 41 of sufficient length to serve as the base member of an elbow. A cover member 42 suitably configured to engage with the base member 40 and to form therewith an enclosed receptacle is provided. The engagement between the cover member 42 and the base member 40 is effected by clips 43 on the cover member, which fit snugly into recesses 44 formed in the base member. An especially satisfactory engagement may be effected if the clips are provided with ridges 45 adapted to engage slots 46 adjacent the recesses 44 in the base member 40 (Fig. 9).

As in the fitting described in conjunction with Figs. 1 to 4, the base member 40 is provided with short tongues 47 and the cover member 42 with cooperating knockout portions 50 to engage with conduits leading to the fitting and to receive them in the receptacle formed by the base member and the cover member. The short tongues 47 may be scored adjacent the edge of the base member so that they may be broken off in the event that they are not to be used.

The tongue 41 is bendable transversely substantially at any desired point, for example, as indicated by the dotted lines in Fig. 5. When thus bent, the tongue is adapted to serve as the base member of an elbow and to engage with a conduit (not shown) leading to the elbow. To complete the elbow, an elbow cover 51 is provided for engagement with the tongue and with the receptacle formed by the base member 40 and the cover member 42, an opening 52 being provided in the cover member 42 to receive the elbow cover. Advantageously, one leg portion 51a of the elbow cover 51 is longer than the other leg portion 51b thereof, in order to increase adjustability of the fitting.

To install the modified fitting, the base member 40 is suitably fastened in position over a baseboard or other projection 53 or 53a, for example, by means of a screw 54. Wire-carrying conduits leading to the fitting are installed as desired, and the tongue 41 is bent around the projection 53 or 53a, so that the elbow of which it forms the base member will properly fit the particular projection involved. After a conduit (not shown) leading to the elbow has been introduced into engagement with the tongue 41 and after the wires passing therethrough and which are to pass through the elbow have been placed in position, the elbow cover 51 is installed. When the projection 53 is relatively broad (Fig. 7), the tongue 41 may be bent adjacent its outer end portion, and the elbow cover 51 may be installed with its longer leg portion 51a adjacent the base member 40. When the projection 53a is relatively narrow (Fig. 8), the tongue may be bent adjacent its inner end portion and the elbow cover may be installed with its shorter leg portion 51b adjacent the base member 40.

After the necessary electrical connections have been made, the assembly of the fitting is completed by placing the cover member 42 in position over the base member 40, the elbow cover 51, and the conduits leading to the receptacle.

A third modification of a fitting constructed in accordance with the invention is shown in Figs. 10 to 13. In this modification, a base member 60 is provided with a tongue 61, the tongue 61 being adapted to serve as the base member of an elbow and to engage with a conduit (not shown) leading to the elbow. The tongue 61 is scored to define a plurality of segments 62, any number of which may be broken or otherwise severed from the tongue to adjust its length as may be desired. Small tongues 63, with which the base member is also provided, furnish means for the engagement thereof with conduits leading to the fitting. The edge portions of the base member 60 are turned up to provide flanges 64, 65, and with these flanges a cover member 66 frictionally engages, thereby to form with the base member an enclosed receptacle. The end portions 67 of the cover member 66 define channels adapted to cooperate with the small tongues 63 of the base member and to receive conduits leading to the fitting. An opening 68 in the cover member serves to receive the cover of the elbow.

An elbow cover 69 completes the elements of the fitting. One leg portion 69a of the elbow cover 69 is scored or slotted along one leg to define a plurality of segments 70. Any number of the segments 70 may be broken or otherwise severed from the scored leg portion of the elbow cover 69 to adjust the length thereof as desired. The length of each of the segments 70 of the elbow cover 69 preferably is the same as the length of each of the segments 62 of the tongue 61. When a given number of segments 70 have been broken from the scored leg of the elbow cover, a corresponding number of segments 62 may be broken from the tongue, thereby to maintain the overall length of the elbow cover and the overall length of the tongue, which serves as the base member of the elbow, substantially equal.

The modified fitting may be installed over a baseboard or other projection in the following manner: The base member 60 is placed in position over a projection 71 and is fastened thereto by means of a screw 72. Conduits leading to the fitting are introduced into engagement with the small tongues 63, and the tongue 61 is then bent around the projection 71 so that the elbow, of which it forms the base member, will properly fit the particular projection which it overlies. A conduit (not shown) leading to the elbow is introduced into engagement with the tongue 61, electrical wiring is suitably installed and connected, and thereafter the elbow cover 69 is placed in position over the tongue 61, with which it engages to form an enclosed elbow. In order that the leg portion 69a of the elbow cover adjacent the base member of the receptacle will fit properly, its length is adjusted by breaking therefrom an appropriate number of segments 70. A corresponding number of segments 62 are then broken from the tongue 61 to adjust its length to that of the elbow cover. The assembly of the fitting is completed by placing the cover member 66 in engagement with the base member 60 so that the opening 68 in the cover member receives the elbow cover 69 and the end portions 67 of the cover member overlap the conduits leading to the fitting.

From the foregoing it will be seen that the invention contemplates the provision of fittings having varying degrees of adjustability. In the case of the fitting described in conjunction with Figs. 1 to 4, the adjustability thereof is limited by the length of the slot in the tongue, which may amount to a half to three quarters of an inch in length; for many purposes a greater degree of adjustability is unnecessary. Thus, for example, most baseboards will not vary in thickness by more than three quarters of an inch, so that this form of fitting will provide ample adjustability to insure a neat installation over most baseboards.

In those cases where a greater degree of adjustability is necessary or desirable, the fitting described in conjunction with Figs. 5 to 9 may be employed. In this modification, the point at which the tongue is bent, and hence the position of the angle of the elbow, may be varied within limits determined only by the length of the tongue. By providing an elbow cover having legs of different lengths, the adjustability of the fitting is substantially enhanced, for in such case the length of the elbow adjacent the receptacle may correspond either to the length of the shorter leg portion or to the length of the longer leg portion of the elbow cover. In the case of the modified fitting described in conjunction with Figs. 10 to 13, a still greater degree of adjustability is provided by making adjustable the length of the leg of the elbow cover adjacent the receptacle.

Fittings constructed in accordance with the invention may be employed with advantage in almost any installation where a wire conduit system must overlie a baseboard or similar projection, and the fittings themselves are easily designed to match existing types of conduit, such, for example, as the type of conduit described in Patent No. 1,981,742, dated November 20, 1934. Moreover, the fittings may readily be connected electrically to the balance of the conduit system for purposes of grounding.

I claim:

1. A fitting for use in conjunction with electrical conduits which comprises a base member, a tongue associated with the base member and adapted to serve as the base member of an elbow, the tongue being capable of adjustment with respect to the length of the leg portion thereof adjacent the base member, a cover member adapted to engage with the base member and to form therewith an enclosed receptacle, and an elbow cover for engagement with the tongue to provide an enclosed elbow extending at least within the outer surface of said enclosed receptacle.

2. A fitting for use in conjunction with electrical conduits which comprises a base member, a cover member adapted to engage with the base member and to form therewith an enclosed receptacle, a tongue associated with the base member and adapted to engage with a conduit and to serve as the base member of an elbow, said tongue being capable of adjustment so that the position of the elbow of which the tongue forms the base member is adjustable relative to the receptacle, an elbow cover adapted to engage with the tongue to provide an enclosed elbow extending at least within the outer surface of said enclosed receptacle, and provision for the adjustment of the leg portion of the elbow cover adjacent the receptacle to correspond to the adjustment of the tongue.

3. A fitting for use in conjunction with electrical conduits which comprises a base member, a cover member adapted to engage with the base member and to form therewith an enclosed receptacle, means associated with the base member to provide for engagement with conduits leading to the receptacle, cooperating means associated with the cover member for receiving the conduits, a tongue associated with the base member and adapted to engage with a conduit and to serve as the base member of an elbow, said tongue being capable of adjustment so that the position of the elbow, of which it forms the base member, is adjustable relative to the receptacle, and an elbow cover adapted to engage with the tongue to provide an enclosed elbow extending at least within the outer surface of said enclosed receptacle.

4. A fitting for use in conjunction with electrical conduits which comprises a base member, a cover adapted to engage with the base member and to form therewith an enclosed receptacle, a tongue associated with the base member and adapted to serve as the base member of an elbow, means associated with the base member and the tongue comprising a screw passing through a slot in the tongue and engaging with the base member to provide for slidable adjustment of the tongue with respect to the base member, and an elbow cover for engagement with the tongue and extending at least within the outer surface of said enclosed receptacle, thereby to provide an enclosed elbow that is adjustable with respect to the leg adjacent the receptacle.

5. A fitting for use in conjunction with electrical conduits which comprises a base member, a cover member adapted to engage with the base member and to form therewith an enclosed receptacle, a tongue associated with the base member and adapted to serve as the base member of an elbow, said tongue being bendable transversely substantially at any desired point and thereby providing for the adjustment of the length of the leg of the elbow, of which it forms the base member, adjacent the receptacle, and an elbow cover for engagement with the tongue associated with the base member of the receptacle to provide an enclosed elbow extending at least within the outer surface of said enclosed receptacle.

6. A fitting for use in conjunction with electrical conduits which comprises a base member, a cover member adapted to engage with the base member and to form therewith an enclosed receptacle, a tongue associated with the base member and adapted to serve as the base member of an elbow, said tongue being bendable transversely substantially at any desired point and thereby providing for the adjustment of the length of the leg of the elbow, of which the tongue forms the base member, adjacent the receptacle, and an elbow cover having one leg longer than the other adapted to engage with the tongue, after it has been bent, to form an enclosed elbow extending at least within the outer surface of said enclosed receptacle.

7. A fitting for use in conjunction with electrical conduits which comprises a base member, a cover member adapted to engage with the base member and to form therewith an enclosed receptacle, a tongue associated with the base member and adapted to serve as the base member of an elbow, said tongue being bendable transversely substantially at any desired point and thereby providing for the adjustment of the length of the leg of the elbow, of which the tongue forms the base member, adjacent the receptacle, and an elbow cover having one leg of adjustable length adapted to engage with the tongue associated with the base member to provide an enclosed elbow extending at least within the outer surface of said enclosed receptacle.

8. A fitting for use in conjunction with electrical conduits which comprises a base member, a cover member adapted to engage with the base member and to form therewith an enclosed receptacle, a tongue associated with the base member and adapted to serve as the base member of an elbow, said tongue being bendable transversely substantially at any desired point and thereby providing for the adjustment of the length of the leg of the elbow, of which the tongue forms the base member, adjacent the receptacle, and an elbow cover adapted to engage with the tongue associated with the base member of the receptacle to provide an enclosed elbow extending at least within the outer surface of said enclosed receptacle, one leg of the elbow cover being scored at intervals to render that leg readily adjustable in length.

CHARLES E. RUTHERFORD.